United States Patent
Rogers

(10) Patent No.: US 7,581,324 B1
(45) Date of Patent: Sep. 1, 2009

(54) WHEEL ALIGNMENT SYSTEM USING SMART MEMS

(75) Inventor: Steven W. Rogers, Conway, AR (US)

(73) Assignee: Snap-On Incorporated, Kenosha, WI (US)

( * ) Notice: Subject to any disclaimer, the term of this patent is extended or adjusted under 35 U.S.C. 154(b) by 274 days.

(21) Appl. No.: 11/652,558

(22) Filed: Jan. 12, 2007

(51) Int. Cl.
G01B 5/24 (2006.01)
G01B 7/30 (2006.01)

(52) U.S. Cl. .................. 33/203; 33/203.12; 33/203.18

(58) Field of Classification Search .................. 33/203, 33/203.18, 203.19, 203.2, 613, 645
See application file for complete search history.

(56) References Cited

U.S. PATENT DOCUMENTS

| | | | |
|---|---|---|---|
| 7,100,289 B1 | 9/2006 | Strege et al. | |
| 7,181,852 B2 * | 2/2007 | Bryan | 33/203.18 |
| 7,313,869 B1 * | 1/2008 | Rogers | 33/203.18 |
| 7,412,899 B2 * | 8/2008 | Mian et al. | 73/802 |
| 7,458,165 B2 * | 12/2008 | Rogers | 33/203.18 |
| 2004/0194327 A1 | 10/2004 | Bryan et al. | |
| 2008/0016707 A1 * | 1/2008 | Rogers | 33/203.18 |
| 2008/0086900 A1 * | 4/2008 | Rogers | 33/288 |

FOREIGN PATENT DOCUMENTS

WO   WO 98/25106 A1   6/1998

* cited by examiner

*Primary Examiner*—Yaritza Guadalupe-McCall
(74) *Attorney, Agent, or Firm*—McDermott Will & Emery LLP.

(57) ABSTRACT

A wheel alignment system may include a wheel alignment sensor configured to provide information relevant to the inclination of the wheel. The wheel alignment sensor may contain an encapsulated package. The encapsulated package may contain a micro electromechanical sensor configured to sense inclination of the micro electromechanical sensor and a digital signal processing system configured to compensate for a deficiency in the wheel alignment sensor. The wheel alignment system may also include a wheel alignment processing system associated with the wheel alignment sensor and configured to receive and process the information relevant to the inclination of the wheel from the wheel alignment sensor and to provide useful output relating to the information about the inclination of the wheel.

22 Claims, 4 Drawing Sheets

WHEEL ALIGNMENT SYSTEM USING SMART MEMS

BACKGROUND

1. Technical Field

This application relates to vehicle service equipment, including wheel alignment systems.

2. Description of Related Art

Vehicle service equipment may utilize one or more sensors configured to measure or detect one or more parameters relevant to a servicing effort. Wheel alignment systems, for example, may utilize one or more sensors to determine the inclination of a wheel on the vehicle.

Various types of inclination sensors have been used. Some utilize pendulous masses in viscous liquid, forced balance servos, and/or electrolytic vials. Sometimes, however, the size, cost, and/or reliability of these sensors can be problematic.

Micro electromechanical sensors, sometimes referred to as MEMS, have also been used in connection with automotive service equipment, such as wheel alignment systems. However, MEMS can be sensitive to temperature, have limited resolution and accuracy, and/or a low signal-to-noise ratio.

Components external to the MEMS have been added in an attempt to compensate for these problems. However, these external components can add to the cost of the system, require additional assembly, increase bulk, and introduce new problems due to stray capacitance.

SUMMARY

A wheel alignment system may include a wheel alignment sensor configured to provide information relevant to the inclination of the wheel. The wheel alignment sensor may contain an encapsulated package. The encapsulated package may contain a micro electromechanical sensor configured to sense inclination of the micro electromechanical sensor and a digital signal processing system configured to compensate for a deficiency in the wheel alignment sensor. The wheel alignment system may also include a wheel alignment processing system associated with the wheel alignment sensor and configured to receive and process the information relevant to the inclination of the wheel from the wheel alignment sensor and to provide useful output relating to the information about the inclination of the wheel.

Vehicle service equipment may include a vehicle service sensor configured to provide information about a serviceable component in the vehicle. The vehicle service sensor may contain an encapsulated package. The encapsulated package may contain a micro electromechanical sensor configured to sense a parameter relating to the serviceable component in the vehicle and a digital signal processing system configured to compensate for a deficiency in the vehicle service sensor. The vehicle service equipment may also include a vehicle service processing system associated with the vehicle sensor and configured to receive and process the information about the serviceable component in the vehicle from the vehicle sensor and to provide useful output relating to the information about the serviceable component in the vehicle.

These, as well as other components, steps, features, objects, benefits, and advantages, will now become clear from a review of the following detailed description of illustrative embodiments, the accompanying drawings, and the claims.

These drawings disclose illustrative embodiments of the concepts that are discussed, illustrated and inherent herein. They illustrate these concepts; they do not set forth all of their embodiments. Numerous other embodiments may be used in addition or instead. Details that are apparent are also often omitted to save space or for more effective illustration. When the same numeral appears in different drawings, it is intended to refer to the same or like components or steps.

DETAILED DESCRIPTION OF ILLUSTRATIVE EMBODIMENTS

Illustrative embodiments of certain concepts are now discussed. This discussion illustrates these concepts; it does not set forth all of their embodiments. Numerous other embodiments may be used in addition or instead, including those that are apparent from the discussion that is presented. Details that are apparent are also often omitted to save space or for more effective presentation. The concepts that are disclosed and that are inherent may be practiced without the specified details or with alternative equivalent components and steps to those that are described.

Figure 1:
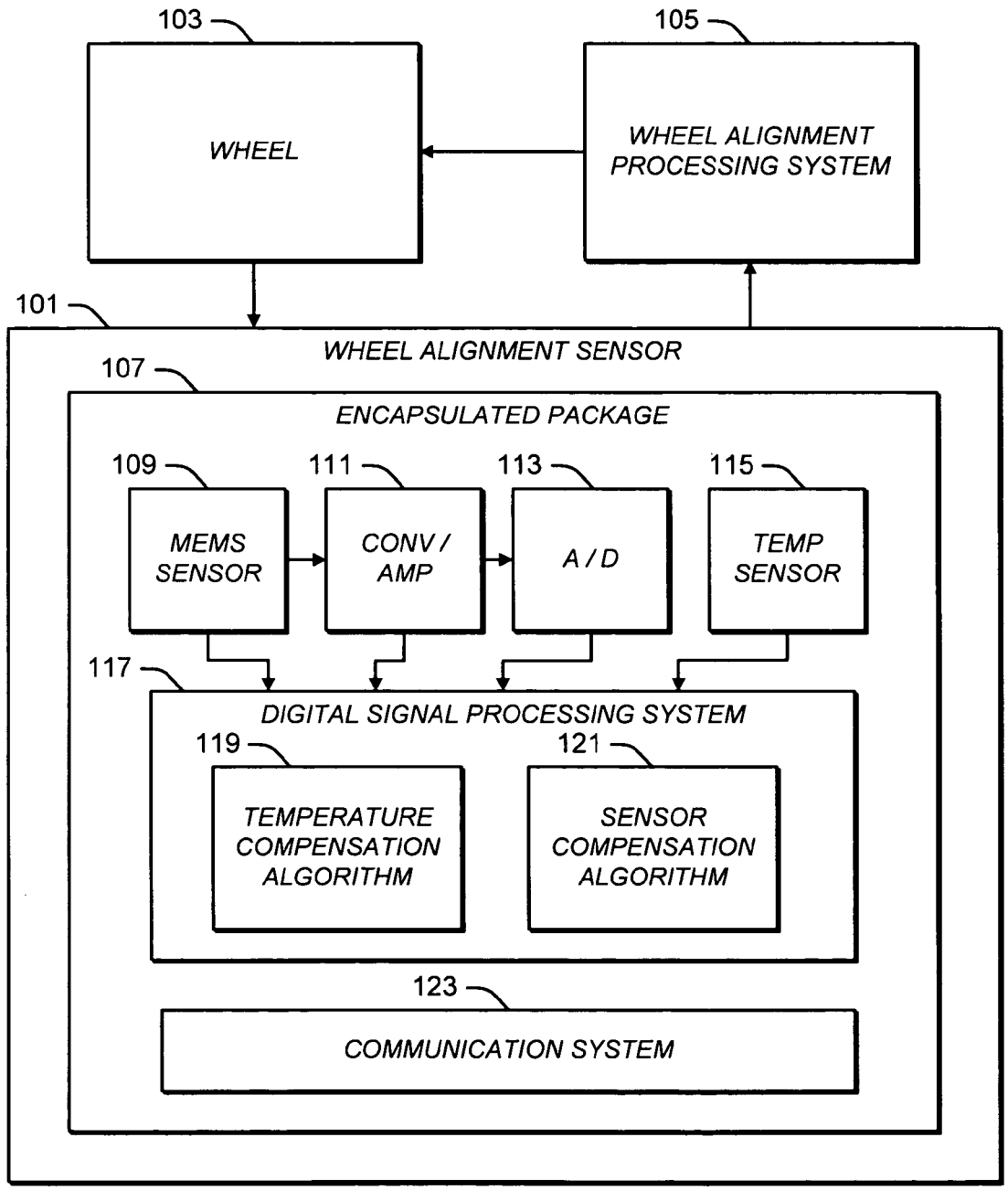
FIG. 1 is a block diagram of a wheel alignment system using an encapsulated micro electromechanical sensor and a digital signal processing system containing compensating algorithms.

FIG. 1 is a block diagram of a wheel alignment system using an encapsulated micro electromechanical sensor and a digital signal processing system containing compensating algorithms. As shown in FIG. 1, a wheel alignment sensor 101 may be configured to be coupled to a wheel 103 and to provide information about the inclination of the wheel 103. The wheel alignment sensor 101 may also be associated with a wheel alignment processing system 105.

The wheel alignment sensor 101 may include an encapsulated package 107. The encapsulated package 107 may include a micro electromechanical sensor (MEMS) 109, a converter/amplifier 111, an analog-to-digital converter 113, a temperature sensor 115, a digital signal processing system 117 that may include a temperature compensation algorithm 119 and a sensor compensation algorithm 121, and an I/O system 123.

The wheel alignment sensor 101 may be configured to be coupled directly or indirectly to the wheel 103 in any way. For example, the wheel 103 may have a rim and the wheel alignment sensor 101 may be configured to be directly affixed to the rim of the wheel 103. The wheel 103 may have an axle about which the wheel 103 rotates, and the wheel alignment sensor 101 may instead or in addition be configured to be indirectly coupled to the wheel by being configured to be affixed to the axle. The wheel alignment sensor may be sized, shaped or otherwise configured to facilitate this coupling.

The means by which the wheel alignment sensor 101 may be affixed to the wheel 103 may vary. An adhesive, clamp, magnet, and/or other means may be used. The coupling may be temporary or permanent.

The MEMS sensor 109 may be of any type. It may be configured to sense a parameter relating to the wheel 103, such as the inclination of the wheel. For this purpose, the MEMS sensor 109 may be configured to measure the static inclination of the wheel 103 and/or changes in the inclination as the wheel 103 rotates.

The MEMS sensor 109 may be configured to measure static and/or dynamic inclination in a single plane, in two planes, in three planes, or in a larger number of planes. Two, three or more of the planes may or may not be substantially orthogonal with respect to one another. The MEMS sensor 109 may be optimized for the particular application and/or for the range of expected measurement values.

Any type of device and/or configuration may be used for the MEMS sensor 109. In one embodiment, a substrate may be suspended by springs, such as polysilicon springs. This may allow the substrate to move in response to acceleration in one or more directions. Sets of radial fingers may surround the substrate, each positioned between plates that are affixed to the substrate. Each finger and pair of fixed plates may make up a differential capacitor. Deflection of the substrate may be determined by measuring changes in the differential capacitance.

Figure 2:
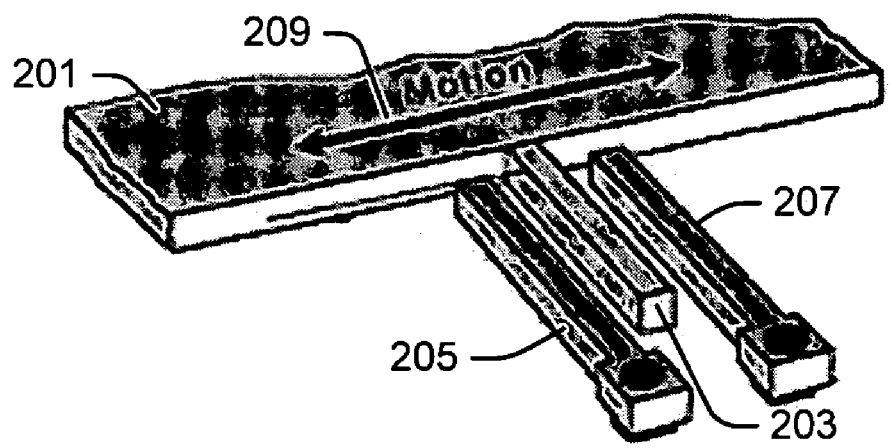
FIG. 2 illustrates a portion of a micro electromechanical sensor that uses differential, cantilevered capacitors.

FIG. 2 illustrates a portion of a micro electromechanical sensor (MEMS) that uses a differential, cantilevered capacitor. As shown in FIG. 2, the MEMS may include a substrate 201 to which may be affixed a finger 203 positioned between a fixed plate 205 and a fixed plate 207. Changes in the acceleration of the substrate 201, such as changes caused by different inclinations of the substrate 201 with respect to the direction of gravity, may cause the finger 203 to move with respect to the fixed plates 205 and 207. This movement, in turn, may cause a change in the capacitance between the finger 203 and the fixed plate 205 and a corresponding but substantially opposite change in the capacitance between the finger 203 and the fixed plate 207. One or more additional finger/fixed plate sets may be in parallel with the one shown in FIG. 2 to enhance the collective changes in capacitance that take place. Similarly, one or more finger/fixed plate sets may be connected to the substrate 201 in one or more different orientations so as to effectively detect movement of the substrate in directions other than the "motion" direction illustrated by an arrow 209 in FIG. 2.

The configuration shown in FIG. 2 may be effective to detect dynamic acceleration, such as shock or vibration, and/or static acceleration, such as inclination or gravity.

The MEMS sensor may be of any construction and may be made by any means. For example, the finger 203 and/or the fixed plates 205 and 207 may be etched in silicon. They may in addition or instead be micro machined.

One or more inductors and/or one or more resistors may be used in addition or instead of the capacitor illustrated in FIG. 2. In this embodiment, the inductors and/or resistors may similarly be positioned and/or configured to cause a variation in their inductances and/or resistances as a function or the static or dynamic acceleration of the micro electromechanical sensor.

The MEMS sensor may in addition or instead be thermally based. As is known, these devices measure inclination by measuring changes in the transfer of heat by convection that are caused by changes in acceleration. Such devices may eliminate the need for movable mechanical structures.

Referring back to FIG. 1, the converter/amplifier 111 may be connected to the MEMS sensor 109 and configured to convert the output of the MEMS sensor 109 into a particular type of signal and/or to amplify the output or particular type of signal. For example, the converter/amplifier 111 may be configured to convert a differential measurement in capacitance, inductance, and/or resistance into a voltage that is a function of that capacitance, inductance, and/or resistance. In one embodiment, the converter/amplifier 111 may be configured to measure the differential capacitance using synchronous modulation/demodulation techniques. The converter/amplifier 111 may include appropriate compensation circuitry to limit the bandwidth of the system to improve the signal-to-noise ratio. The output of the converter/amplifier 111 may be a voltage and/or a pulse-width modulated signal which is proportional to acceleration and/or any other type of signal.

The analog-to-digital converter 113 may receive an analog output from the converter/amplifier 111, such as an output voltage that is proportional to acceleration, and convert it into a digital signal. Any type of analog-to-digital converter may be used for this purpose. The resolution and responsiveness of the analog-to-digital converter 113 may be selected so as to be appropriate for the desired application.

A digital output of the analog-to-digital converter 113 may be delivered to the digital signal processing system 117. The digital signal processing system 117 may be configured to compensate for a deficiency in the wheel alignments sensor, such as to correct, alter, adapt, filter, and/or refine the digital signal from the analog-to-digital converter 113. One purpose may be to compensate for a failure of the MEMS sensor 109 to accurately reflect its inclination. The digital signal processing system 117 may be configured to enhance the accuracy, resolution, output response and/or temperature independence of the MEMS sensor 109. It may in addition or instead be configured to detect failures in the MEMS sensor 109, and/or an abnormal or exceptional value. The digital signal processing system 117 may also or instead be configured to provide compensation for errors that may be injected into the system by the converter/amplifier 111 and/or the analog-to-digital converter 113.

To effectuate this compensation, the digital signal processing system 117 may utilize one or more algorithms. Each algorithm may include one or more programming instructions and/or one or more data values. For example, an algorithm may include a formula for computing the inclination measurement based on the digital signal that is received from the analog-to-digital converter 113. The algorithm may in addition or instead include a table that maps different possible values of digital signal received from the analog-to-digital converter 113 to an inclination measurement.

Some types of compensation may be provided by the digital signal processing system 117 without reference to the specific circumstances of a particular test. For example, the output of the MEMS sensor 109 may not vary linearly as a function of changes in inclination. The digital signal processing system 117 may therefore rely upon the sensor compensation algorithm 121 to correct for this non-linearity. The sensor compensation algorithm 121 may be a formula, a mapping table, or a combination of these.

In other situations, the digital processing system 117 may need to examine one or more parameters that may change from test to test or from component to component. These parameters may include changes in temperature, gain, range, offset voltage, rate of signal change, and/or other circuit characteristics.

The digital signal processing system 117 may be configured to receive information relating to these potentially-variable parameters and/or information from which these potentially-variable parameters may be computed. For example, the temperature sensor 115 may be configured to generate a signal that is representative of the temperature of the MEMS sensor 109. This signal may be delivered to the digital signal processing system 117 and may be used by the temperature compensation algorithm 119 as a basis for causing the digital signal processing system 117 to compensate for errors in the information from the MEMS sensor 109 caused by changes in temperature. The temperature compensation algorithm 119 may accomplish this by utilizing an equation, a mapping table, or a combination of these. The temperature sensor 115 may be within the encapsulated package 107, as illustrated in FIG. 1, or external to it. More than a single temperature sensor may be used.

Operating characteristics, such as gain, offsets, or rates of signal change, may in addition or instead be delivered to the digital signal processing system 117 from the converter/amplifier 111 and/or the analog-to-digital converter 113. This information may similarly be used by the digital signal processing system 117 to provide compensation to enhance the accuracy, resolution, output response, temperature independence, or other characteristic of the inclination measurement.

One or more additional or different algorithms may be used by the digital signal processing system 117 for providing compensation. Each may provide compensation in connection with one or more attributes of the system.

The algorithms that are used by the digital signal processing system 117 may be permanently embedded into a memory that is part of the digital signal processing system 117. All of portions of these algorithms may instead be programmable, i.e., subject to modification after the digital signal processing system 117 is constructed. Changes to the algorithms may be made at a factory, on a job site, or at other locations.

The communication system 123 may be configured to produce analog and/or digital outputs, as well as to receive input commands and data. Digital input and/or output may be implemented in any format, including standard formats such as SPI or I²C.

One or more of the components within the encapsulated package 107 may be part of an Application Specific Integrated Circuit (ASIC). For example, the converter/amplifier 111, the analog-to-digital converter 113, the temperature sensor 115, the digital signal processing system 117, including the temperature compensation algorithm 119 and the sensor compensation algorithm 121, and the communication system 123 may all be part of a single ASIC.

The wheel alignment processing system 105 may be configured to receive wheel alignment information from the wheel alignment sensor 101, such as information about the inclination of the wheel 103. The wheel alignment information from the wheel alignment sensor 101 may be delivered to the wheel alignment processing system 105 over a wired and/or wireless connection.

The wheel alignment processing system 105 may be configured to utilize the wheel alignment information from the wheel alignment sensor 101 in any way. For example, the wheel alignment processing system 105 may be configured to display the wheel alignment information and/or information relating to it, such as information about adjustments in the wheel alignment that may or may not be needed. The wheel alignment processing system 105 may in addition or instead be coupled to the wheel 103 so as to provide feedback to the wheel 103 in connection with alignment measurements that are made. For example, the wheel alignment processing system 105 may be configured to rotate the wheel 103 as part of the measuring and/or realignment process. It may in addition or instead be configured to direct one or more light beams or other pointing-indicia at one or more locations on the wheel 103 so as to facilitate the making of other measurements and/or so as to specify changes in alignment that may be needed.

The wheel alignment processing system 105 may include one or more stand-alone or networked computers. The wheel alignment processing system 105 may be at the same location as the wheel alignment sensor 101 or may in whole or in part be located remotely and in communication with the wheel alignment sensor 101 through a communication channel, such as the Internet.

Figure 3:
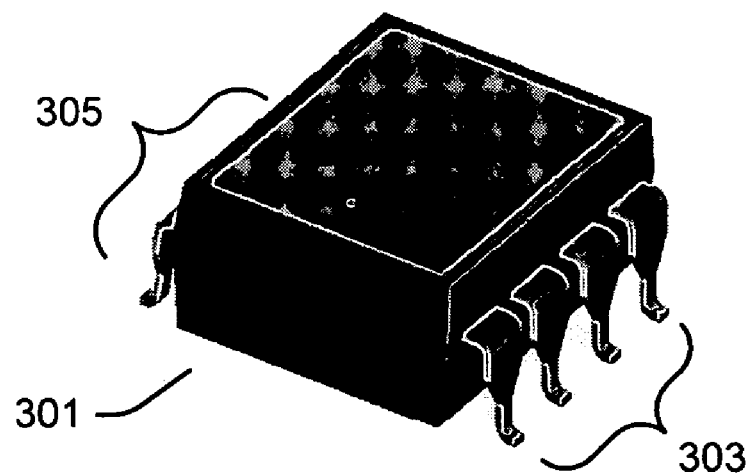
FIG. 3 illustrates an encapsulated package containing a micro electromechanical sensor and a signal processing system.

FIG. 3 illustrates an encapsulated package containing a micro electromechanical sensor and a signal processing system. The encapsulated package that is shown in FIG. 3 may have encapsulated with it the MEMS sensor 109, the converter/amplifier 111, the analog-to-digital converter 113, the temperature sensor 115, and the digital signal processing system 117, including the temperature compensation algorithm 119 and the sensor compensation algorithm 121, that are illustrated in FIG. 1. The converter/amplifier 111, the analog-to-digital converter 113, the temperature sensor 115, and the digital signal processing system 117, including the temperature compensation algorithm 119 and the sensor compensation algorithm 121, may all be contained within the encapsulated package 301 on a single ASIC. Alternatively, all of the components illustrated in FIG. 1 within the encapsulated package may be on a single, monolithic silicon substrate.

When constructing the encapsulated package 301, a hollow cavity may be constructed around the MEMS sensor 109 to allow components within the MEMS sensor 109, such as the finger 203, to move freely with respect to the substrate of the sensor.

The electrical components within the encapsulated package 301 may be connected to external leads 303 and 305 using any means, such as wire bonding. The internal circuitry may be protected within silicone gel and a silicone lid.

An example of the encapsulated package 301 is the SCL64T-D01 digital inclinometer produced by VTI Technologies, Inc. of Dearborn, Mich. This is a single package device that consists of a silicone bulk micro-machined sensing element chip and a signal conditioning application specific integrated circuit (ASIC) mounted in a pre-molded package and wire-bonded to appropriate contacts. The sensing element and ASIC are protected with silicone gel and a silicon lid.

Figure 4:
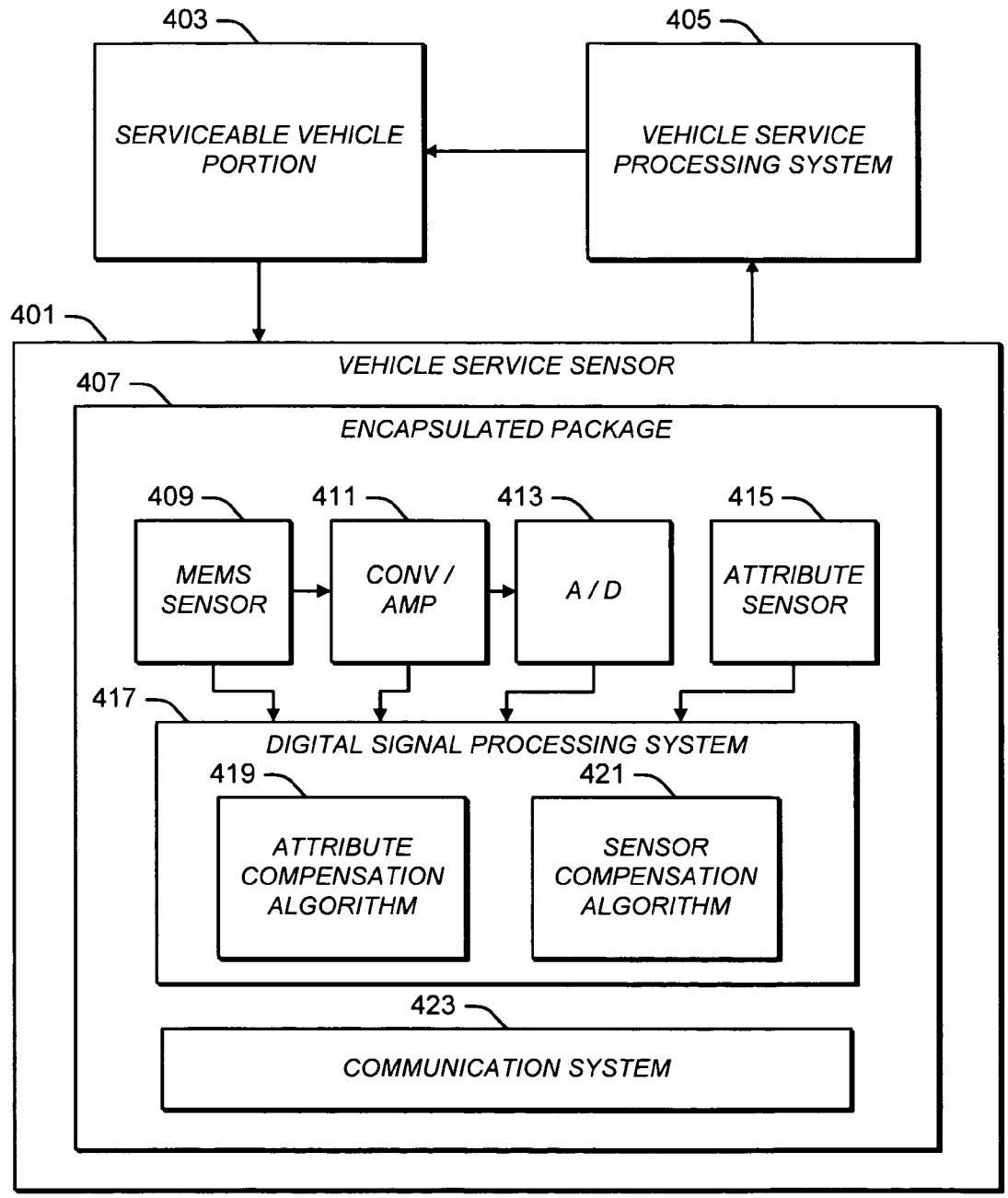
FIG. 4 is a block diagram of vehicle service equipment using an encapsulated micro electromechanical sensor and a digital signal processing system containing compensating algorithms.

FIG. 4 is a block diagram of vehicle service equipment using an encapsulated micro electromechanical sensor and a digital signal processing system containing compensating algorithms. FIG. 4 is similar to FIG. 1, except that it illustrates that the concepts that have been discussed above in connection with FIG. 1 may be used in numerous vehicle service equipment applications other than wheel alignment.

More specifically, a vehicle service sensor 401 may be configured to be coupled to a serviceable vehicle portion 403 and to be associated with a vehicle service processing system 405. The vehicle service sensor 401 may include an encapsulated package 407 containing a MEMS sensor 409, a converter/amplifier 411, an analog-to-digital converter 413, an attribute sensor 415, a digital signal processing system 417 containing an attribute compensation algorithm 419 and a sensor compensation algorithm 421, and a communication system 423.

The serviceable vehicle portion 403 may be a wheel, such as the wheel 103 shown in FIG. 1. It may in addition or instead be any other serviceable vehicle portion, such as a steering wheel, steering linkage, engine, carburetor, and/or air conditioning unit.

The MEMS sensor 409 may be configured to sense inclination, as is the MEMS sensor 109 shown in FIG. 1. The MEMS sensor 409 may in addition or instead be configured to sense any other type of parameter, such as pressure, vibration, and/or gaseous content.

The converter/amplifier 411 may be similar to the converter/amplifier 111, except that it may be adapted to process the output of the particular type of MEMS sensor 409 that is used.

The analog-to-digital converter 413 may be similar to the analog-to-digital converter 113, except that it may be adapted to convert the type and range of anticipated analog signals from the MEMS sensor 409.

The attribute sensor 415 may be a temperature sensor, such as the temperature sensor 115 shown in FIG. 1. It may in addition or instead be a different type of sensor, such as a vibration sensor, pressure sensor, flow sensor, level sensor, and/or gaseous material sensor.

The digital signal processing system 417 may be similar to the digital signal processing system 117 shown in FIG. 1, except that it may be configured to provide compensation for a deficiency in the vehicle service sensor 401, such as a failure of the MEMS sensor 409 to accurately reflect a parameter in addition to or instead of inclination, such as vibration, pressure and/or gaseous content.

The digital signal processing system 417 may be configured with one or more compensation algorithms, such as the attribute compensation algorithm 419 and or the sensor compensation algorithm 421. The attribute compensation algorithm 419 may be configured to compensate for errors in any type of parameter, such as temperature, pressure, level, and/or gaseous content. Similarly, the sensor compensation algorithm 421 may be configured to compensate for any non-linearity in the system, such as a non-linearity in the MEMS sensor 409.

The vehicle service equipment illustrated in FIG. 4 may be used for other wheel alignment related applications or for applications other than wheel alignment. This may include steering wheel level sensing, servicing steering linkage, engines, carburetors, and/or air conditioning units.

Except for the differences noted above, the components in the vehicle service equipment illustrated in FIG. 4 may be configured, interconnected, and used in the same manner as described above in connection with their corresponding components in FIG. 1.

Figure 5:
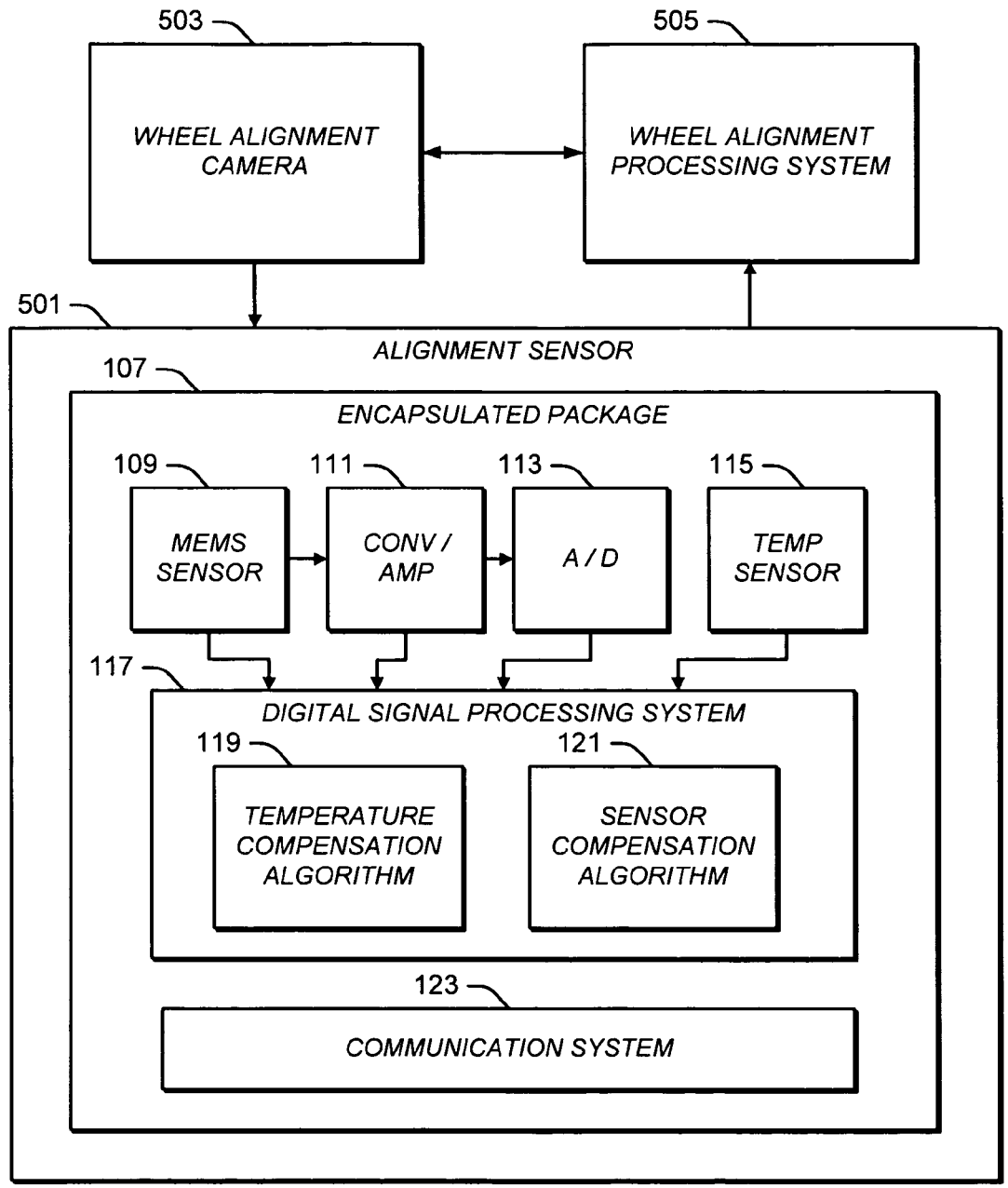
FIG. 5 is a block diagram of another wheel alignment system using an encapsulated micro electromechanical sensor and a digital signal processing system containing compensating algorithms.

FIG. 5 is a block diagram of another wheel alignment system using an encapsulated micro electromechanical sensor and a digital signal processing system containing compensating algorithms.

A wheel alignment camera 503 may be configured and used to capture one or more images from a target that may be clamped to the wheel 103. The target may contain a plurality of reflective surfaces.

An alignment sensor 501 may be coupled to the wheel alignment camera 503 and configured to provide information about the inclination of the wheel alignment camera 503.

This image information from the camera 503 and the inclination information from the alignment sensor 502 may be processed by a wheel alignment processing system 505 to provide information about the alignment of the wheel to which the target is clamped in accordance with established techniques. The wheel alignment processing system may otherwise be configured, interconnected, and used in the same manner as the wheel alignment processing system 105 in FIG. 1. The alignment sensor 501 and/or the wheel alignment processing system 505 may be calibrated so as to correlate the readings from the alignment sensor 501 with the inclination of the wheel alignment camera 503.

The remaining components in FIG. 5 may be configured, interconnected, and used in the same manner as described above in connection with FIG. 1.

The embodiments that have been described may include or be utilized with any appropriate voltage or current source, such as a battery, alternator, fuel cell or the like. These may provide any appropriate voltage or current, such as about 12 or 42 volts or the like.

The embodiments that have been described may be used with any type of system or engine. These systems or engines may use fossil fuels, such as gasoline, natural gas, propane or the like, electricity, such as that generated by battery, magneto, fuel cell and the like, wind and hybrids or combinations thereof. These systems and engines may be incorporated into other systems, such as an automobile, a truck, a boat or ship, motorcycle, a generator, and airplane and the like.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

In short, the scope of protection is limited solely by the claims that now follow. That scope is intended to be as broad as is reasonably consistent with the language that is used in the claims and to encompass all structural and functional equivalents.

The phrase "means for" when used in a claim embraces the corresponding structures and materials that have been described and their equivalents. Similarly, the phrase "step for" when used in a claim embraces the corresponding acts that have been described and their equivalents. The absence of these phrases means that the claim is not limited to any of the corresponding structures, materials, or acts or to their equivalents.

Nothing that has been stated or illustrated is intended to cause a dedication of any component, step, feature, object, benefit, advantage, or equivalent to the public, regardless of whether it is recited in the claims.

What is claimed is:

1. A wheel alignment system comprising:
    a wheel alignment sensor configured to provide information relevant to the inclination of the wheel, the wheel alignment sensor containing an encapsulated package, the encapsulated package containing a micro electromechanical sensor configured to sense inclination of the micro electromechanical sensor and a digital signal processing system configured to compensate for a deficiency in the wheel alignment sensor; and
    a wheel alignment processing system associated with the wheel alignment sensor and configured to receive and process the information relevant to the inclination of the wheel from the wheel alignment sensor and to provide useful output relating to the information about the inclination of the wheel.

2. The wheel alignment system of claim 1 wherein the micro electromechanical sensor includes a capacitor configured to change capacitance in response to changes in the inclination of the capacitor.

3. The wheel alignment system of claim 2 wherein the capacitor is a differential capacitor.

4. The wheel alignment system of claim 2 wherein the capacitor includes a cantilevered element.

5. The wheel alignment system of claim 1 wherein the micro electromechanical sensor includes an inductor configured to change inductance in response to changes in the inclination of the inductor.

6. The wheel alignment system of claim 1 wherein the micro electromechanical sensor includes a resistor configured to change resistance in response to changes in the inclination of the resistor.

7. The wheel alignment system of claim 1 wherein the micro electromechanical sensor is configured to measure changes in heat transfer caused by changes in the inclination of the sensor.

8. The wheel alignment system of claim 1 further comprising an analog-to-digital converter configured to convert an analog signal derived from the micro electromechanical sensor into a digital signal used by the digital processing system.

9. The wheel alignment system of claim 1 wherein the digital signal processing system is configured to compensate for a failure of the micro electromechanical sensor to accurately reflect the inclination of the micro electromechanical sensor.

10. The wheel alignment system of claim 9 wherein the digital processing system includes an algorithm that is configured to determine the needed compensation.

11. The wheel alignment system of claim 9 wherein the algorithm is configured to compensate for variations in the signal derived from the micro electromechanical sensor caused by changes in temperature.

12. The wheel alignment system of claim 11 further comprising a temperature sensor coupled to the digital signal processing system.

13. The wheel alignment system of claim 12 wherein the temperature sensor is contained within the encapsulated package.

14. The wheel alignment system of claim 9 wherein the algorithm is configured to compensate for a non-linear relationship between the inclination and an output of the micro electromechanical sensor.

15. The wheel alignment system of claim 1 wherein the micro electromechanical sensor is configured to sense inclination in at least two substantially orthogonal directions.

16. The wheel alignment system of claim 1 wherein the micro electromechanical sensor is micro machined.

17. The wheel alignment system of claim 1 wherein the wheel alignment sensor is configured to be coupled to the wheel and wherein the inclination information is indicative of the inclination of the wheel.

18. The wheel alignment system of claim 1 further comprising a wheel alignment camera that is configured to capture an image of a target attached to the wheel, wherein the wheel alignment sensor is coupled to the camera and the inclination information is indicative of the inclination of the camera.

19. Vehicle service equipment comprising:
a vehicle service sensor configured to provide information about a serviceable component in the vehicle, the vehicle sensor containing an encapsulated package, the encapsulated package containing a micro electromechanical sensor configured to sense a parameter relating to the serviceable component in the vehicle and a digital signal processing system configured to compensate for a deficiency in the vehicle service sensor; and
a vehicle service processing system associated with the vehicle sensor and configured to receive and process the information about the serviceable component in the vehicle from the vehicle sensor and to provide useful output relating to the information about the serviceable component in the vehicle.

20. The vehicle service equipment of claim 19 wherein the micro electromechanical sensor includes an accelerometer.

21. The vehicle service equipment of claim 19 wherein the digital signal processing system contains an algorithm that is configured to determine the needed compensation.

22. A wheel alignment sensor configured to provide information relevant to the inclination of the wheel of the vehicle, the wheel alignment sensor containing an encapsulated package, the encapsulated package containing a micro electromechanical sensor configured to sense inclination of the micro electromechanical sensor and a digital signal processing system configured to compensate for a deficiency in the wheel alignment sensor.

* * * * *